United States Patent
Lavoie et al.

(10) Patent No.: US 6,256,128 B1
(45) Date of Patent: Jul. 3, 2001

(54) ELECTRICITY METER DATA SOURCE IDENTIFICATION CIRCUIT

(75) Inventors: Gregory P. Lavoie, Rochester; Curtis W. Crittenden, Dover; John J. Jamison, Alton; Robert E. Lee, Jr., Gonic, all of NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/866,788

(22) Filed: May 30, 1997

(51) Int. Cl.[7] .................................................. H04B 10/02
(52) U.S. Cl. .................... 359/145; 359/148; 359/155; 359/110; 359/163
(58) Field of Search .................................... 359/110, 145, 359/148, 155, 163

(56) References Cited

U.S. PATENT DOCUMENTS

| | | | |
|---|---|---|---|
| 5,204,768 | * | 4/1993 | Tsakiris et al. ........................ 359/148 |
| 5,668,977 | * | 9/1997 | Swanstrom et al. .................. 395/500 |
| 5,734,328 | * | 3/1998 | Shinbori ................................ 359/155 |

* cited by examiner

Primary Examiner—Leslie Pascal
(74) Attorney, Agent, or Firm—Carl B. Horton, Esq.; Damian Wasserbauer; Armstrong Teasdale LLP

(57) ABSTRACT

An electricity meter which, in one embodiment, includes a detection circuit, or unit, coupled to the meter microcomputer and supplies a detection signal to the microcomputer indicative of the data source is described. Using the signal supplied by the detection unit, the microcomputer can determine whether to allow access to metering data and other data stored in the meter. In an exemplary embodiment, the detection unit has three different modes, or states, of operation. These states of operation are sometimes referred to as the steady state, the optical port data transmit state, and the option board connector transmit state. The steady state refers to the condition of the unit when no data is being transmitted to the meter microcomputer from either optical port or the option board. In the steady state, the detection signal supplied to the microcomputer is high. In the optical port data transmit state, the detection signal transitions, as least momentarily, from a high state to a low state. In the option board connector transmit state, the detection signal remains in the high state even though data is being communicated to the microcomputer. The microcomputer, by detecting the state of the detection signal as well as the presence of data on the data supply line, can determine the source of the data. The microcomputer can the respond as appropriate.

17 Claims, 2 Drawing Sheets

ELECTRICITY METER DATA SOURCE IDENTIFICATION CIRCUIT

FIELD OF THE INVENTION

This invention relates generally to electricity metering and more particularly, to an electricity meter configurable to detect whether data is being supplied to the meter via a meter optical port or via an option board connector.

BACKGROUND OF THE INVENTION

In many electronic electricity meters, communications with the meter microcomputer can be performed via an optical port or an option board connector. For example, in some known meters, an electrical connector is provided so that various option boards, such as a telephone modem communication board, may be electrically connected to the meter microcomputer. In addition, an optical port electrically coupled to the meter microcomputer and accessible to devices external to the meter may also be provided. Asynchronous serial data may be communicated to the meter microcomputer via the optical port and the option board connector. All the meter data is available in a predefined format (an ANSI defined protocol) on the communication channel which connects the port and the option board connector to the microcomputer.

To prevent theft of or tampering with the metering data, it is desirable to control option board access to the meter microcomputer via the communication channel. Preventing such access, however, should not inhibit communication with the meter microcomputer via the optical port.

It would be desirable to provide a data source identification unit, or circuit, which transmits a signal to the meter microcomputer indicative of the source of communication, i.e., either the optical port or the option board connector. It also would be desirable to provide such a circuit without significantly increasing the costs associated with fabrication of a meter.

SUMMARY OF THE INVENTION

These and other objects may be attained by an electricity meter which, in one embodiment, includes a detection circuit, or unit, coupled to the meter microcomputer which supplies a detection signal to the microcomputer indicative of the data source. Using the signal supplied by the detection unit, the microcomputer can determine whether to allow access, via the communication channel, to metering data and other data stored in the meter.

More particularly, and in an exemplary embodiment, the detection unit has three different modes, or states, of operation. These states of operation are sometimes referred to herein as the steady state, the optical port data transmit state, and the option board connector transmit state. The steady state refers to the condition of the unit when no data is being transmitted to the meter microcomputer from either optical port or the option board. In the steady state, the detection signal supplied to the microcomputer is high. In the optical port data transmit state, the detection signal transitions, as least momentarily, from a high state to a low state. In the option board connector transmit state, the detection signal remains in the high state even though data is being communicated to the microcomputer. The microcomputer, by detecting the state of the detection signal as well as the presence of data on the communication channel, can determine the source of the data. The microcomputer can then respond and allow access as appropriate.

The above described detection unit provides a signal, sometimes referred to herein as a detection signal, to the meter microcomputer indicative of the source of communication, i.e., either the optical port or the option board connector. Using such information, the microcomputer can then determine whether to allow access to the meter data. Such unit also is believed to be low in costs, in terms of both components and assembly labor.

DETAILED DESCRIPTION

Figure 1:
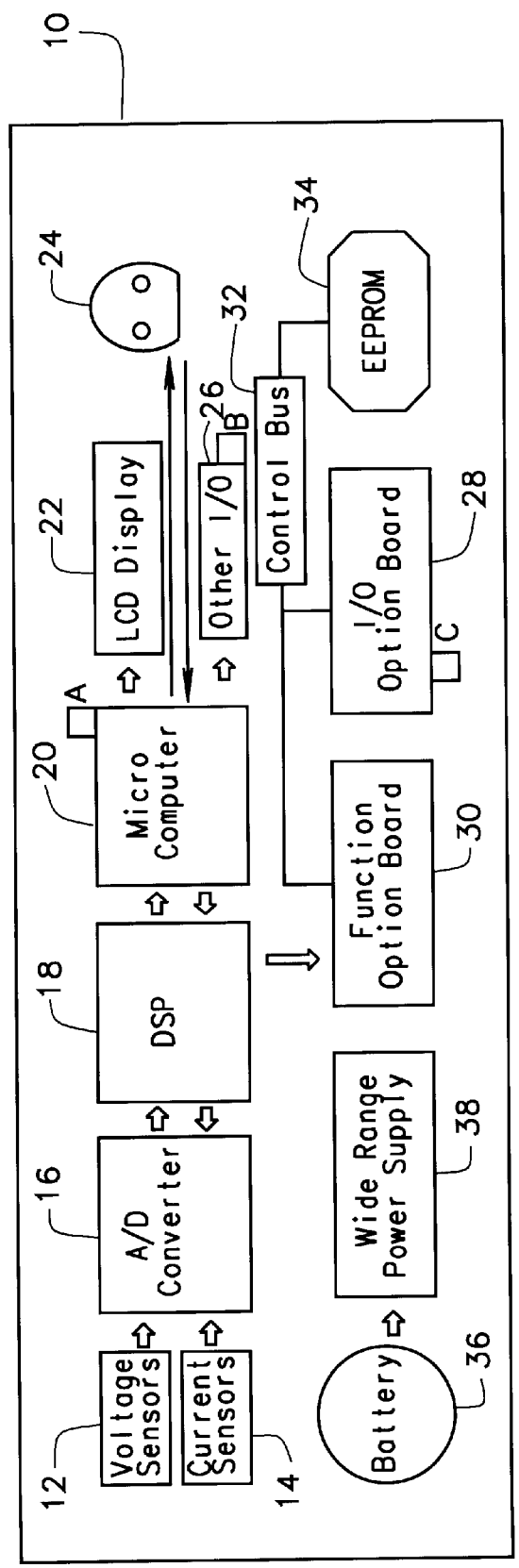
FIG. 1 is a block diagram of an electronic energy meter.

FIG. 1 is a block diagram illustration of an exemplary electronic energy meter 10 which, for example, is commercially available from General Electric Company, 130 Main Street, Somersworth, N.H. 03878, and generally referred to as the KV meter. The KV meter can be modified to incorporate the detection circuit described below in more detail. Although the present apparatus and methods are described herein in the context of an electronic electricity meter, it should be understood that the present invention is not limited to practice with any one particular meter. The present invention can be utilized in connection with other microcomputer based meters.

Referring now specifically to FIG. 1, meter 10 includes voltage sensors 12 and current sensors 14. Sensors 12 and 14, in operation, typically are coupled to the power lines supplying power to site at which the meter is located. Sensors 12 and 14 are coupled to an analog to digital (A/D) converter 16 which converts the input analog voltage and current signal to digital signals. The output of converter 16 is provided to a digital signal processor (DSP) 18. DSP 18 supplies microcomputer 20 with digitized metering quantities, e.g., $V^2H$, $I^2H$. Microcomputer 20, using the metering quantities supplied by DSP 18, performs additional metering calculations and functions. DSP 18 may, for example, be a processor commercially available as Model Number TMS320 from Texas Instruments Company, P.O. Box 6102, Mail Station 3244, Temple, Tex. 76503, modified to perform metering functions.

Microcomputer 20 is coupled to a liquid crystal display 22 to control the display of various selected metering quantities and to an optical communications port 24 to enable an external reader to communicate with computer 20. Port 24 may be the well known OPTOCOM™ port of General Electric Company, 130 Main Street, Somersworth, N.H. 03878, which is in accordance with the ANSI type II optical port. Microcomputer 20 may also generate additional input and output ports 26 used for various other functions as is well known in the art. Microcomputer 20 may, for example, be an eight bit microcomputer commercially available from Hitachi America, Inc., Semiconductor & I.C. Division, Hitachi Plaza, 2000 Sierra Point Parkway, Brisbane, Calif. 94005-1819, modified to perform metering functions.

Microcomputer 20 also is coupled to an input/output (I/O) board 28 and to a function, or high function, board 30. DSP 18 also supplies outputs directly to high function board 30. Microcomputer 20 further is coupled, via a control bus 32, to an electronically erasable programmable read only memory (EEPROM) 34. I/O board 28 and high function board 30 also are coupled, via bus 32, to EEPROM 34.

Back-up power is supplied to the meter components described above by a battery 36 coupled to a wide range power supply 38. In normal operation when no back-up power is required, power is supplied to the meter components from the power lines via power supply 38.

Many functions and modifications of the components described above are well understood in the metering art. The present application is not directed to such understood and known functions and modifications. Rather, the present application is directed to the methods and apparatus for configuring a meter to be compatible with many different metering applications as described below in more detail. In addition, although the methods and apparatus are described below in the hardware environment shown in connection with FIG. 1, it should be understood that such methods and apparatus are not limited to practice in such environment. The subject methods and apparatus could be practiced in many other environments.

Further, it should be understood that the present invention can be practiced with many alternative microcomputers, and is not limited to practice in connection with just microcomputer 20. Therefore, and as used herein, the term microcomputer is not limited to mean just those integrated circuits referred to in the art as microcomputers, but broadly refers to microcomputers, processors, microcontrollers, application specific integrated circuits, and other programmable circuits.

Figure 2:
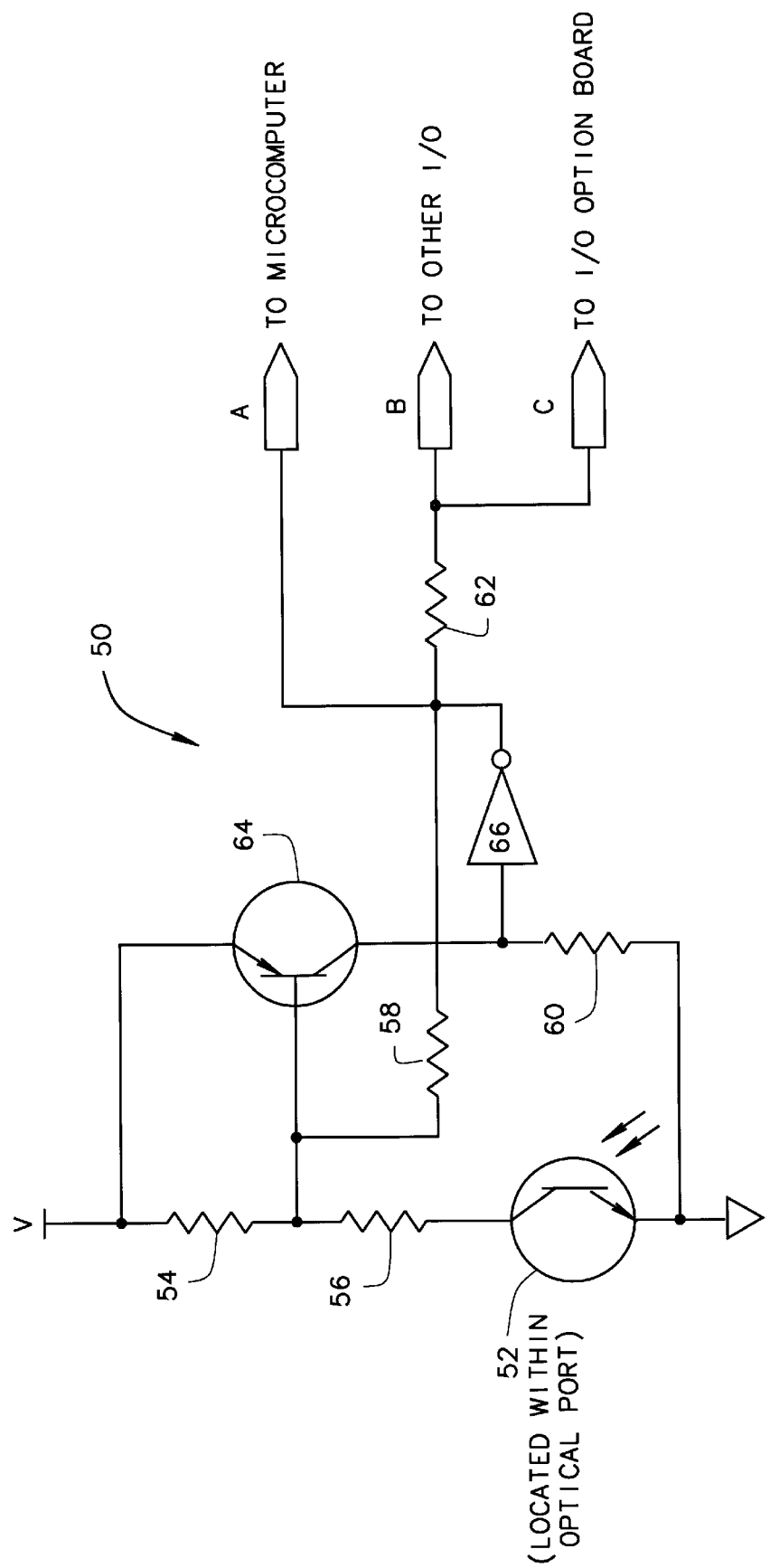
FIG. 2 is a circuit schematic diagram of a detection unit in accordance with one embodiment of the present invention.

FIG. 2 is a circuit schematic diagram of an exemplary detection circuit, or unit, 50 in accordance with one embodiment of the present invention. Generally, unit 50 couples to meter microcomputer 20 as described below in more detail and at least based in part on the state of a detection signal present on one of the connectors of unit 50, microcomputer 20 can determine the source of data being supplied to microcomputer 20. Using this information, microcomputer 20 can determine whether to allow access to metering data and other data stored in the meter. Typically, when the optical communication port is the data source, then the communications is allowed, but if the source is an option board, then microcomputer 20 can be programmed to perform additional checks before allowing such communications and access.

Referring now specifically to FIG. 2, unit 50 includes a light receiving element, or phototransistor, 52 which is configured to be located within optical communications port 24 (FIG. 1). Specifically, phototransistor 52 is a receiver for optical signals transmitted to port 24 by an external device. Unit 50 also includes resistors 54, 56, 58, 60, and 62, transistor 64, hex inverting buffer 66, connector A, connector B, and connector C. Exemplary resistances for resistors 54, 56, 58, 60, and 62 are set forth below.

Resistor 54=1.21 kilo-ohms,
Resistor 56=240 ohms,
Resistor 58=100 kilo-ohms,
Resistor 60=22 kilo-ohms, and
Resistor 62=22 kilo-ohms.

Resistor 54 and the collector of transistor 64 are connected to a supply voltage V. Resistors 54 and 56 and emitter of phototransistor 52 are connected in series with the collector of phototransistor 52 which is connected to ground. The junction of resistor 54 and resistor 56 is connected to resistor 58 and the base of transistor 64. Emitter of transistor 64 is connected to the input of hex inverting buffer 66 and resistor 60. Resistor 60 is connected to ground.

The output of hex inverting buffer 66 is connected to connector A, resistor 58 and resistor 62. Resistor 62 is connected to connector B and connector C. The data signal present at connector B and at connector C sometimes is referred to herein as the RXD signal. The optical receive data signal at connector A is sometimes referred to herein as the ORXD signal or as the detection signal. Connectors A and B are configured to be electrically connected to ports of microcomputer 20, and connector C is configured to be electrically connected to the option board connector. The electrical circuit which supplies a signal to connector B sometimes is referred to as the communications channel.

Unit 50 has three different modes, or states, of operation. These states of operation are referred to herein as the steady state, the optical port data transmit state, and the option board connector transmit state. The steady state of unit 50 refers to that state of unit 50 when no data is being transmitted to microcomputer 20 from either optical port 24 or the option board. In steady state, therefore, phototransistor 52 is in the not illuminated and no current flows through resistors 54 and 56. Consequently, the voltage applied to the base of transistor 64 is approximately equal to the voltage applied to the collector of transistor 64. As a result, transistor 64 is in a non-conducting state creating a low state to the input of hex inverting buffer 66. Application of the low state to the input of hex inverting buffer 66 results in a high state output. The absence of data at connector C allows the high state at the output of buffer 66 to be coupled through resistor 62 to the signal at connector B. Therefore, in steady state, the signals present at connectors A and B as detectable by microcomputer 20 are both high.

In the optical port data transmit state, an optical signal is applied to optical port 24, and phototransistor 52 transitions to a conducting state which causes the voltage at the collector of phototransistor 52 to approximately zero. Resistors 54 and 56 function as a voltage divider, and based on their resistances, the voltage applied to the base of transistor 64 drops sufficiently so that transistor 64 is in a conducting mode. In the conducting mode, the voltage applied to the input of hex inverting buffer 66 is set by the voltage divider of the collector-emitter drop of transistor 64 and resistor 60. The collector-emitter drop of transistor 64 will be significantly small such that sufficient voltage will be applied to the input of hex inverting buffer 66 resulting in the output of buffer 66 changing from a high state to a low state.

At least upon transmission of a start bit to phototransistor 52 from an external communications device, the changing output of buffer 66 causes the ORXD signal at connector A to transition from a high state to a low state. Microcomputer 20, by detecting the change of state of the ORXD signal, can then determine that communications have been initiated via optical port 24, and based upon such change of state, microcomputer 20 can respond as appropriate (e.g., for a particular meter, microcomputer 20 can be programmed to either allow or inhibit such communication). Asynchronous serial data communications may then occur with microcomputer 20 via connector B. Upon completion of the serial communication via optical port 24, unit 50 returns to the steady state.

In the option board connector transmit state, and upon application of a signal from the option board through connector C, the RXD signal at connector B is the same as the RXD signal present on connector C. The signal at connector A remains in the high state. Microcomputer 20, by detecting the presence of the data signal on connector B with signal on connector A remaining in the high state, i.e., no state transition, can determine that communications are being initiated via the option board and microcomputer 20 can respond as appropriate (e.g., for a particular meter, microcomputer 20 can be programmed to either allow or inhibit such communication). Asynchronous serial data communications may then occur between the option board and microcomputer 20 via connector B. Upon completion of the serial communication via the option board, unit 50 returns to the steady state.

The above described detection unit provides a signal (i.e., signal ORXD) to the meter microcomputer indicative of the source of communication, i.e., either the optical port or the option board connector. Using such information, the microcomputer can then determine whether to allow access to the serial data communications line. Such unit also is believed to be low in costs, in terms of both components and assembly labor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. In an electricity meter, a data source identification circuit for identifying whether communications with a microcomputer of said meter is via an optical port or an alternative data source, said circuit comprising a light receiving element for receiving optical signals, a first connector electrically coupled to said light receiving element, a second connector electrically coupled to said meter microcomputer, and a third connector configured to be electrically connected to the alternative data source, a signal present at said second connector representative of whether communication signals are present at said light receiving element or at the alternative data source.

2. A circuit in accordance with claim 1 wherein said light receiving element is a phototransistor configured to be located in said optical communication port.

3. A circuit in accordance with claim 1 wherein said meter further comprises an option board, said third connector configured to be electrically connected to said option board.

4. A circuit in accordance with claim 3 wherein to indicate that communication is via said optical port, the signal present at said first connector transitions from a first state to a second state.

5. A circuit in accordance with claim 3 wherein to indicate that communication is via said option board, the signal present at said first connector remains in a first state.

6. A circuit in accordance with claim 3 wherein data is transmitted to said microcomputer through said second connector.

7. A method of indicating whether data is being supplied to a meter microcomputer via a meter optical communication port, the meter comprising a microcomputer and a data source identification unit, the data source identification unit comprising a first connector, a second connector, and a third connector, the first connector configured to be connected to the optical communication port and the second connector configured to be electrically connected to the microcomputer, said method comprising the steps of:

utilizing the data source identification unit to detect whether an optical signal is being supplied to the optical port; and providing a signal to the microcomputer through the third connector indicating the detection of an optical signal if the optical signal is detected at the optical port.

8. A method in accordance with claim 7 wherein said step of utilizing the data source identification unit further comprises the step of changing the signal provided to the meter microcomputer from a first state to a second state if the optical signal is detected at the optical port.

9. A method in accordance with claim 7 wherein said step of utilizing the data source identification unit further comprises the step of keeping the signal provided to the meter microcomputer in a first state if no optical signal is detected at the optical port.

10. An electricity meter comprising:

a microcomputer;

an optical communication port; and a data source identification unit configured to be electrically coupled to said microcomputer and to detect whether data is being supplied to said meter via said optical communication port, said data source identification unit comprising first, second, and third connectors, said first connector configured to be connected to said optical communication port and said second connector configured to be electrically connected to said microcomputer; and if the data is being supplied via said optical communication port, said data source identification unit is configured to provide a signal to said microcomputer indicating that said optical communication port is the source of the data being supplied.

11. An electricity meter in accordance with claim 10 wherein said data source identification unit comprises a phototransistor configured to be located in said optical communication port.

12. An electricity meter in accordance with claim 10 wherein said meter further comprises an option board and an option board connector, said third connector configured to be electrically connected to said option board connector.

13. An electricity meter in accordance with claim 12 wherein if data communication is via said optical communication port, a signal present at said first connector indicates that the communication is via said optical communication port.

14. An electricity meter in accordance with claim 13 wherein to indicate that the communication is via said optical communication port, the signal present at said first connector transitions from a first state to a second state.

15. An electricity meter in accordance with claim 12 wherein if data communication is via said option board, a signal present at said first connector indicates that the communication is via said option board.

16. An electricity meter in accordance with claim 15 wherein to indicate that the communication is via said option board, the signal present at said first connector remains in a first state.

17. An electricity meter in accordance with claim 12 wherein data is transmitted through said data source identification unit to said second connector.

* * * * *